(12) United States Patent
Gabel et al.

(10) Patent No.: US 9,834,472 B2
(45) Date of Patent: Dec. 5, 2017

(54) METHOD FOR PRODUCING A GLASS CERAMIC WITH A PREDEFINED TRANSMITTANCE

(71) Applicant: SCHOTT AG, Mainz (DE)

(72) Inventors: Falk Gabel, Schlangenbad (DE); Friedrich Siebers, Nierstein (DE); Ulrich Schiffner, Mainz (DE); Evelin Weiss, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/583,847

(22) Filed: Dec. 29, 2014

(65) Prior Publication Data

US 2015/0111717 A1    Apr. 23, 2015

Related U.S. Application Data

(63) Continuation of application No. PCT/EP2013/063220, filed on Jun. 25, 2013.

(30) Foreign Application Priority Data

Jun. 26, 2012    (DE) .................. 10 2012 105 572

(51) Int. Cl.
  *C03C 10/12*    (2006.01)
  *C03C 4/02*    (2006.01)
  (Continued)

(52) U.S. Cl.
  CPC .......... *C03C 10/0027* (2013.01); *C03C 3/087* (2013.01); *C03C 3/097* (2013.01); *C03C 4/02* (2013.01); *C03C 2204/00* (2013.01)

(58) Field of Classification Search
  CPC ............................ C03C 10/0027; C03C 4/02
  See application file for complete search history.

(56) References Cited

U.S. PATENT DOCUMENTS 4,218,512 A  *  8/1980  Allersma ............ C03C 10/0027
                                                                    428/410
4,455,160 A      6/1984  Rittler
                       (Continued)

FOREIGN PATENT DOCUMENTS

DE         19939787 A1    2/2001
DE      102008050263 A1    4/2010
                (Continued)

OTHER PUBLICATIONS

German Office Action dated Mar. 11, 2013 for corresponding German Patent Application No. 10 2012 105 572.6 with English translation, 8 pages.
(Continued)

*Primary Examiner* — Erin Snelting
(74) *Attorney, Agent, or Firm* — Ohlandt, Greeley, Ruggiero & Perle, L.L.P.

(57) ABSTRACT

A method of manufacturing glass ceramic articles such as glass ceramic plates for cooktops or fireplace windows is provided. The method facilitates the adjustment of a specific hue or a specific absorptivity of the glass ceramic in the visible spectral range. The method is based on the finding that the absorption of light by coloring agents which are appropriate for or present in glass ceramics can be attenuated during the ceramization process by adding substances that have a decoloring effect.

19 Claims, 6 Drawing Sheets

(51) Int. Cl.
  *C03C 10/00* (2006.01)
  *C03C 3/087* (2006.01)
  *C03C 3/097* (2006.01)

(56) References Cited

U.S. PATENT DOCUMENTS

| | | |
|---|---|---|
| 7,473,660 B2 | 1/2009 | Comte et al. |
| 2005/0255983 A1 | 11/2005 | Becker et al. |
| 2011/0226231 A1 | 9/2011 | Siebers et al. |
| 2012/0067865 A1 | 3/2012 | Siebers et al. |
| 2013/0164509 A1* | 6/2013 | Siebers ............... C03C 10/0027 428/210 |
| 2013/0201678 A1* | 8/2013 | Siebers ................... C03B 32/02 362/231 |

FOREIGN PATENT DOCUMENTS

| | | |
|---|---|---|
| DE | 102009032113 A1 | 1/2011 |
| DE | 102010032112 A1 | 1/2012 |
| DE | 102010032113 A1 | 1/2012 |
| EP | 0156479 B1 | 10/1985 |
| GB | 2154575 A | 2/1985 |
| JP | S59116150 A | 7/1984 |
| JP | S60255634 A | 12/1985 |
| JP | 2004251615 A | 9/2004 |
| JP | 2012505136 A | 3/2012 |
| JP | 2012082106 A | 4/2012 |
| WO | 2010040443 A2 | 4/2010 |
| WO | 2010102859 A1 | 9/2010 |
| WO | 2012010278 A1 | 1/2012 |
| WO | 2012010341 A1 | 1/2012 |
| WO | WO 2012059143 A1 * | 5/2012 ............. C03C 3/097 |

OTHER PUBLICATIONS

German Office Action dated Jun. 6, 2013 for corresponding German Patent Application No. 10 2012 105 572.6 with English translation, 5 pages.
International Search Report dated Oct. 1, 2013 for corresponding PCT/EP2013/063220 with English translation, 5 pages.
Written Opinion of the International Searching Authority dated Oct. 1, 2013 for corresponding PCT/EP2013/063220 with English translation, 11 pages.
English translation of International Preliminary Report on Patentability dated Dec. 31, 2014 for corresponding PCT/EP2013/063220, 8 pages.
Peng et al; Excerpt from Glass manufacturing technology foundation textbook; ISBN:978-7-122-03941-5; 2008, English translation, 5 pages.

* cited by examiner

METHOD FOR PRODUCING A GLASS CERAMIC WITH A PREDEFINED TRANSMITTANCE

CROSS REFERENCE TO RELATED APPLICATIONS

This application is a continuation of International Application Serial No. PCT/EP2013/063220 filed Jun. 25, 2013, which claims benefit under 35 U.S.C. §119(a) of German Patent Application No. 10 2012 105 572.6 filed Jun. 26, 2012, the entire contents of both of which are incorporated herein by reference.

BACKGROUND

1. Field of the Invention

The invention generally relates to the manufacturing of glass ceramic articles, such as glass ceramic plates for cooktops or fireplace windows. More particularly, the invention relates to the manufacturing of at least partially transparent glass ceramic articles.

2. Description of Related Art

Glass ceramic plates find application as cooktops, inter alia. The glass ceramics used for this purpose typically exhibit low to zero thermal expansion of usually less than $1.5 \times 10^{-6}/K$ in a temperature range between room temperature and the operating temperature of up to 700° C. In one embodiment, these glass ceramics are transparently dyed throughout their volume in order to hide the components of the hearth arranged below the cooktop. In a second embodiment, the glass ceramics are transparent and the technical components below the glass ceramic can be hidden from view by opaque, i.e. light-blocking coatings on the lower and/or upper surfaces. This transparent embodiment of the glass ceramic is also used for fireplace window applications.

And, for practical or aesthetic reasons it has been desired to enable luminous display elements to shine through the glass ceramic plate. In this case, high transmission and low color distortion are desirable. In the transparent embodiment, a good and unaltered view on a colored lower surface coating, for example, or on the flames in the fireplace should be ensured.

WO 2010/040443 A2 discloses a transparent, dyed cooktop with improved color display capability, which comprises a glass ceramic that includes high quartz mixed crystals as a predominant crystal phase, and the glass ceramic is free of chemical refining agents arsenic oxide and/or antimony oxide, except for inevitable traces. The glass ceramic exhibits transmittance values of greater than 0.1% in the region of visible light in the entire range of wavelengths greater than 450 nm, with a light transmittance in the visible region ranging from 0.8 to 2.5% and in the infrared region at 1600 nm ranging from 45 to 85%.

In order to achieve the coloration, vanadium oxide, $V_2O_5$, and iron oxide are added as color-imparting oxides.

Vanadium oxide has a very strong coloring effect. Therefore it is added in appropriately low amounts. This implies that adjustment of an intended transmittance is critical, since small deviations of the vanadium content in the glass mixture will cause strong alterations in the color appearance of the glass ceramic. This problem is exacerbated further when comparatively high transmittance values are to be achieved in the visible spectral range, since this even increases the relative variations of the vanadium oxide content at a given uncertainty in the dosing of the mixture.

Another problem is the adjustment of a specific content of coloring oxide in the preparation of the starting glass in a continuous melting process. If, in this case, it is desired to produce a glass for a glass ceramic that has a higher transmittance, for example, the content of coloring oxide would have to be reduced. However, this is only possible in a complex remelting process in which a large amount of unuseable glass is produced.

It would therefore be desirable to facilitate the adjustment of a specific hue or a specific absorptivity of the glass ceramic in the visible spectral range.

SUMMARY

Accordingly, the invention provides a method for producing a lithium aluminosilicate glass ceramic article, in particular a lithium aluminosilicate glass ceramic plate, comprising the steps of: providing a mixture for lithium aluminosilicate glass ceramics, the mixture including a coloring agent, in particular a coloring oxide which absorbs light in the glass ceramic in the visible spectral range between 450 and 750 nanometers; melting the mixture and producing a glass precursor; and ceramizing the glass precursor to obtain a glass ceramic article. Before or during melting a decoloring agent is added to the mixture, which decoloring agent reduces the absorptivity of the coloring agent upon ceramization in at least a sub-region of the visible spectral range, so that, in total, the transmittance of the glass ceramic article in the visible spectral range between 450 and 750 nanometers at least remains the same, and preferably increases.

In particular, the proportion of the decoloring agent may be determined based on a predefined transmittance of the glass ceramic article, and the amount of the decoloring agent corresponding to this proportion may be added to the mixture.

The invention is based on the finding that the light absorptivity of coloring agents which are appropriate for or present in glass ceramics can be attenuated during the ceramization process by adding other substances that have a decoloring effect. It is possible in this manner to prepare a mixture which when processes to glass ceramics exhibits high light absorptivity in the visible spectral range, in particular between 450 and 750 nanometers, or in a portion of the visible spectral range, and then to selectively attenuate this light absorptivity by adding the decoloring agent in order to obtain the desired transmittance. In a continuous melting process for preparing the starting glass, it is furthermore in particular possible to keep the same mixture for glass ceramics of different transmittance in the visible spectral range.

According to one embodiment of the invention it is therefore suggested that a plurality of glass ceramic products having different transmittance are produced successively by varying the amount of added decoloring agent. Because the composition of the mixture is maintained, it is possible to prepare the starting glass for the glass precursor in a vat in a continuous melting process. Since only the content of the decoloring agent is varied, complex remelting can be dispensed with.

Also surprisingly, in some cases the method of the invention even works when adding a decoloring agent which itself is an agent which has a color-imparting effect due to absorption in the visible spectral range. Therefore, although according to this embodiment even more intrinsically coloring agents are included in the glass, the result in total will be an attenuation of absorptivity of the glass ceramic due to the decoloration during ceramization.

Particularly suitable as a decoloring agent are metal oxides of polyvalent metals. In this case, it is possible to add a single one of such metal oxides to the mixture, or different metal oxides of polyvalent metals may be added.

As a coloring agent in the mixture provided, likewise, one or more metal oxides of polyvalent metals are suitable.

For the embodiment of the transparently volume-dyed glass ceramic, vanadium oxide $V_2O_5$ is particularly advantageous as a coloring agent in the mixture. Vanadium oxide is polyvalent and can strongly vary its coloring effect by transformation between different oxidation states. In addition, the coloring effect is very strong. In an example without decoloration according to the invention, already a content of 0.025 percent by weight usually causes a light transmittance in the visible spectral range of only 2% or less in a glass ceramic plate of 4 mm thickness.

Especially for the coloring agent vanadium oxide, iron oxide and/or cerium oxide have proved to be very effective as a decoloring agent. Therefore, according to one embodiment of the invention, vanadium oxide is included in the mixture as a coloring agent, and $Fe_2O_3$ and/or $CeO_2$ is added as a decoloring agent before or during the preparation of the starting glass, i.e. in particular before or during the melting including the refining, in order to adjust a desired or predefined transmittance.

According to yet another embodiment of the invention, a lithium aluminosilicate glass ceramic article is produced which includes vanadium oxide as a color-imparting component or coloring agent in a proportion of at least 0.005, preferably at least 0.01, more preferably up to 0.05 percent by weight, and as a further component the glass ceramic includes iron oxide in a proportion of at least 0.1 percent by weight, wherein the iron oxide content is at least the same or greater than the vanadium content, and wherein light transmittance of the glass ceramic plate in the visible spectral range when illuminated perpendicularly to the surface of the glass ceramic plate is greater than 2.5%. Preferably, transmittance is even adjusted to at least 5%.

A corresponding effect is obtained not only when adding iron oxide, but also with cerium oxide. Accordingly, alternatively or additionally, an addition of at least 0.1 percent by weight of cerium oxide may be contemplated.

In the context of the invention, transmittance refers to the light transmittance as measured according to DIN 5033 which is identical to the Y value according to the CIE color system as measured with standard illuminant C. This light corresponds to white light of a color temperature of 6800 K and thus represents average daylight. In other words, the glass ceramic has a Y value according to the CIE color system as measured with standard illuminant C in transmission of at least Y=2.5%, preferably at least Y=5%.

Preferably, a glass ceramic according to the invention or the mixture provided for producing the glass ceramic comprises the following essential components, in percent by weight, on an oxide basis:

| | |
|---|---|
| $Li_2O$ | 3-5; |
| $Al_2O_3$ | 18-25; |
| $SiO_2$ | 55-75; and |
| $TiO_2$ | 1-5. |

According to the description in DE 19939787 C2 and WO 2010/040443 A2, the coloring is caused by $V_2O_5$ in a redox process. In the crystallizable starting glass, the coloring caused by $V_2O_5$ is still rather weak and leads to a slightly greenish hue. During ceramization the redox process is proceeding, vanadium is reduced and the redox partner is oxidized. The refining agent is assumed to function as the primary redox partner, which has been shown by Mössbauer studies on Sb- and Sn-refined compositions. During ceramization, part of the Sb or Sn or As in the starting glass is transformed into a higher oxidation state $Sb^{5+}$ or $Sn^{4+}$ or $As^{5+}$, respectively. It has been assumed that the vanadium is incorporated into the glass ceramic crystals in a reduced oxidation state, as $V^{4+}$ or $V^{3+}$, and has an intense color-imparting effect there due to electron charge transfer reactions. As a further redox partner, $TiO_2$ may also enhance the coloring effect caused by vanadium oxide. Based on this mechanism it can be assumed that sufficiently large quantities of iron oxide or cerium oxide partially inhibit the incorporation of the vanadium oxide into the glass ceramic crystal and/or counteract a reduction of the vanadium oxide.

The glass ceramic crystal considered is the main phase usually composed of high quartz mixed crystals or the seed crystals of $TiO_2$, $ZrO_2$, and, if present, $SnO_2$.

For the decoloration mechanism on which the invention is based it has accordingly been found favorable to avoid too high levels of tin oxide and titanium oxide. Accordingly, in a modification of the invention it is contemplated that the glass ceramic has a content of tin oxide of less than 0.5 percent by weight, preferably a content of tin oxide in a range from 0.15 to 0.5 percent by weight, more preferably in a range from 0.2 to 0.45 percent by weight. Such tin oxide contents yet prove to be sufficient for refining the starting glass of the glass ceramic even without significant amounts of arsenic oxide, $As_2O_3$, or antimony oxide, $Sb_2O_3$. The total content of $As_2O_3$ and $Sb_2O_3$ together is preferably less than 0.1 percent by weight, more preferably the glass ceramic is technologically free of these refining agents. That means they will not be detectable by conventional methods for determining weight proportions.

The refining by employing tin oxide may be promoted by chloride and/or sulfate compounds as well as through high-temperature refining above 1700° C., preferably above 1750° C. Additions of fluorine or bromine compounds for refining purposes are unfavorable because of the corrosive effect of the vapors on the melting unit. Therefore, preferably, the contents thereof in the glass ceramic are below 0.05 wt %, as a result of impurities in the mixture, for example. Most preferably, the contents of fluorine or bromine compounds are less than 0.01 wt %.

As to the titanium oxide content it is accordingly favorable that it is not greater than 5 percent by weight, as in the above composition. A content from 2.5 to 5 percent by weight is preferred. Most preferably, the content is not more than 3.9 percent by weight. At the same time this content ensures that a sufficient nucleation for ceramization occurs, because titanium oxide functions as a nucleating agent.

The elements iron and cerium have in common that they are easily transformed between different oxidation states. It is assumed that instead of a reduction of the vanadium oxide by tin oxide and titanium oxide a reduction of the $Fe^{3+}$ and/or $Ce^{4+}$ takes place, or that the reduction of the vanadium oxide competes with the reduction of $Fe^{3+}$ and/or $Ce^{4+}$. Considering this, it is favorable to define a ratio for the total content of tin oxide and titanium oxide relative to the total content of iron oxide and cerium oxide. Therefore, according to one modification of the invention, the following relationship is met for the contents of tin oxide, titanium oxide, iron oxide, and cerium oxide: $(M(SnO_2)+0.1*M$ $(TiO_2)/(M(Fe_2O_3)+M(CeO_2))<4$, preferably $<3$. Here, M denotes the amount or proportion in percent by weight of the metal oxide in brackets.

According to a preferred embodiment of the invention it may be contemplated that the sum of the proportions by weight of iron oxide and cerium oxide in the lithium aluminosilicate glass ceramic article is greater than the proportion by weight of vanadium oxide by a factor from 5 up to a factor of 20. Beginning from a factor of 5 it is possible to achieve a useful decoloration of the glass ceramic article. By a suitable choice of the factor in a range between 5 and 20 the transmittance of the glass ceramic article can be adjusted in a wide range. Beyond a factor of 20 no further relevant increase in transmittance in the visible range can be achieved any more. Rather, a further increase of the iron oxide or cerium contents would lead to an undesirable reduction of transmittance in the infrared range.

The invention now makes it possible according to one embodiment to adjust a constant vanadium oxide content in the mixture and to adjust the desired hue or the desired transmittance through the iron oxide content. The alteration in hue as a function of the variation of the iron oxide content is less than it is the case when varying the vanadium oxide content. Thus, a desired hue and a desired transmittance can be adjusted very precisely. Accordingly, production-related variations in hue are less pronounced.

However, chromium oxide has been found unfavorable in conjunction with vanadium oxide as a coloring agent and cerium oxide or iron oxide for decoloring purposes. Therefore, according to yet another embodiment of the invention it is contemplated that a mixture is used in which the proportion by weight of chromium or chromium oxide is less than 0.01%, preferably less than 0.005%. Chromium oxide has an additional color-imparting effect and has its own absorption bands. The selective coloring makes it difficult to adjust a smooth transmittance characteristic, and specific display colors might be selectively attenuated. Furthermore, chromium oxide is a strong nucleating agent, but technologically difficult to control. For example in the paper "Ultrafine grained glass-ceramics obtained with $Cr_2O_3$ additions", B. Andrianasolo et al., J. Non-Cryst. Solids 126 (1990) 103-110 it is concluded that chromium is a critical component in the production of ultrafine glass ceramics. Accordingly, although it is not incorporated into the nucleating agent crystal, chromium has an influence on nucleation already in small quantities.

According to yet another embodiment of the invention, a transparently dyed glass ceramic article according to the invention such as in particular a glass ceramic plate is produced by the steps of: preparing a mixture for LAS glass ceramics, wherein the mixture comprises at least 0.005 percent by weight of vanadium oxide, preferably at least 0.01, more preferably up to 0.05 percent by weight of vanadium oxide; predefining a transmittance value of 2.5% or more in the visible spectral range, the transmittance value being higher than the transmittance value of a glass ceramic article produced from a corresponding vanadium oxide containing mixture with an iron oxide content or cerium oxide content of less than 0.1 percent by weight; adding iron oxide and/or cerium oxide in an amount which neutralizes the absorptivity caused by the vanadium oxide in the visible spectral range to such an extent that the predetermined transmittance value is obtained in the glass ceramic article; melting the mixture; producing a glass plate; and ceramizing the glass plate, so that a glass ceramic article is obtained.

Generally, not only limited to this embodiment of the invention, the glass plate may be 3-dimensionally deformed before or during ceramization, so that the glass ceramic article is not necessarily plate-like or entirely flat. To mention an example, a glass ceramic plate for a cooktop may have a molded hollow that can be used as a wok.

BRIEF DESCRIPTION OF THE DRAWINGS

The invention will now be described by way of exemplary embodiments and with reference to the accompanying drawings. In the drawings.

DETAILED DESCRIPTION

Figure 1:
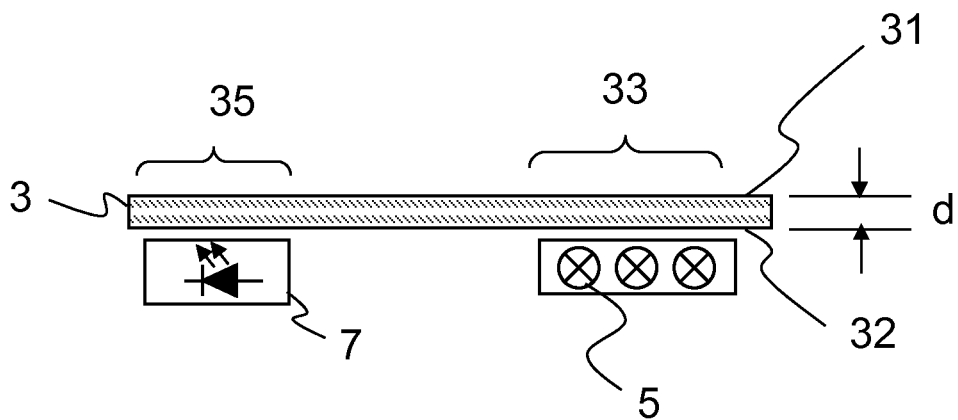
FIG. 1 shows a glass ceramic cooktop including a glass ceramic plate according to the invention.

The method of the invention is particularly suitable for glass ceramic cooktops. In this case the glass ceramic according to the invention exhibits a transmittance such that a very good visibility and color reproduction for self-luminous display elements is achieved. FIG. 1 shows a schematic side view of an exemplary embodiment of a glass ceramic cooktop 1 that comprises a glass ceramic plate 3 according to the invention. Glass ceramic plate 3 has an upper surface 31 and a lower surface 32. Heating elements 5 are arranged below lower surface 32 for heating cookware positioned oppositely on the upper surface 31 in a cooking zone 33, or optionally for directly heating food to be boiled or cooked. Glass ceramic plate 3 has a thickness d, typically in a range from 2 to 6 millimeters.

Generally, without being limited to the illustrated example, at least one self-luminous display element 7 may additionally be arranged below the glass ceramic plate 3, which shines through the glass ceramic plate 3. As a result of the improved transmittance of the glass ceramic plate 3 according to the invention, the latter now transmits in particular not only red light in a considerable intensity. Rather, it is possible to display yellow, green, and blue spectral ranges. Accordingly, in one embodiment of the invention the self-luminous display element 7 is adapted to emit light in the visible spectral range with wavelengths of less than 570 nanometers, preferably less than 510 nanometers. A suitable display element is a light emitting diode display, for example. In accordance with the transmittance in the yellow, green, and blue spectral ranges it is then possible to use display elements emitting in the yellow, green, or blue spectral ranges, for example correspondingly yellow, green, or blue light LEDs, as well as white light LEDs. It is also possible, that the display element consist of a color display that allows for a variety of indications and information for the user.

Display element 7 may, for example, be arranged below a display and/or control area 35 of the glass ceramic plate 3, as illustrated. An arrangement in cooking zone 33 is also conceivable, for example for visually signalling which one of the cooking zones is currently enabled and heating.

Due to the properties of the glass ceramic which will be described in more detail below, even yellow, green, or blue spectral components of the light emitted by the display element 7 will be visible to an observer through the glass ceramic plate 3.

Figure 2:
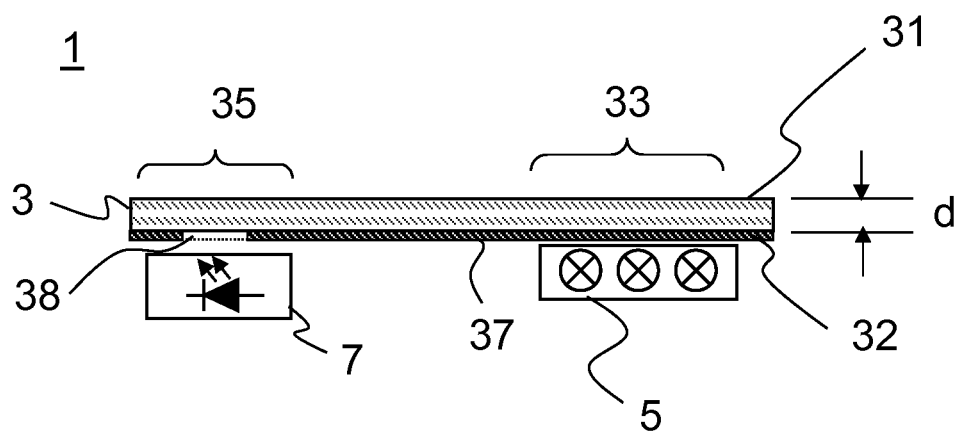
FIG. 2 shows a variation of the glass ceramic cooktop illustrated in FIG. 1.

FIG. 2 shows a variation of the embodiment illustrated in FIG. 1. Due to the comparatively high transmittance of the glass ceramic according to the invention, it may optionally be desirable in turn to reduce transmittance in the visible spectral range. For this purpose, according to one embodiment of the invention exemplified in FIG. 2, an at least partially light-blocking coating 37 is provided on the lower surface 32 of glass ceramic plate 3.

Light-blocking coating 37 is preferably heat resistant. This will be useful at least if the light-blocking coating 37 extends along cooking zone 33, as illustrated in FIG. 2.

Both light absorbing and light reflecting coatings are contemplated as a light-blocking coating 37. The light-blocking coating may even be designed in terms of colors to achieve a desired differentiation of the cooktop. The light-blocking coating 37 serves to ensure that the components of the cooktop arranged below glass ceramic plate 3 remain invisible for an observer. In order to change the design and aesthetics, the light-blocking coating 37 may be varied in color or may be patterned. Layers of organic or inorganic paints, such as lacquer or enamel layers are considered for the light-blocking coating 37. Also, metallic or optical interference reflective coatings may be used. Moreover, reflecting or absorbing coatings may be formed from metal compounds such as oxides, carbides, nitrides, or from mixed compounds of oxides, carbides, nitrides. Optionally, it is also possible to use a semiconductor coating such as a silicon layer as the light-blocking coating 37.

In order not to affect the display capability, according to yet another embodiment of the invention it is contemplated that the light-blocking coating has at least one recess 38, with the self-luminous display element 7 arranged below glass ceramic plate 3 shining through the recess 38.

Figure 3:
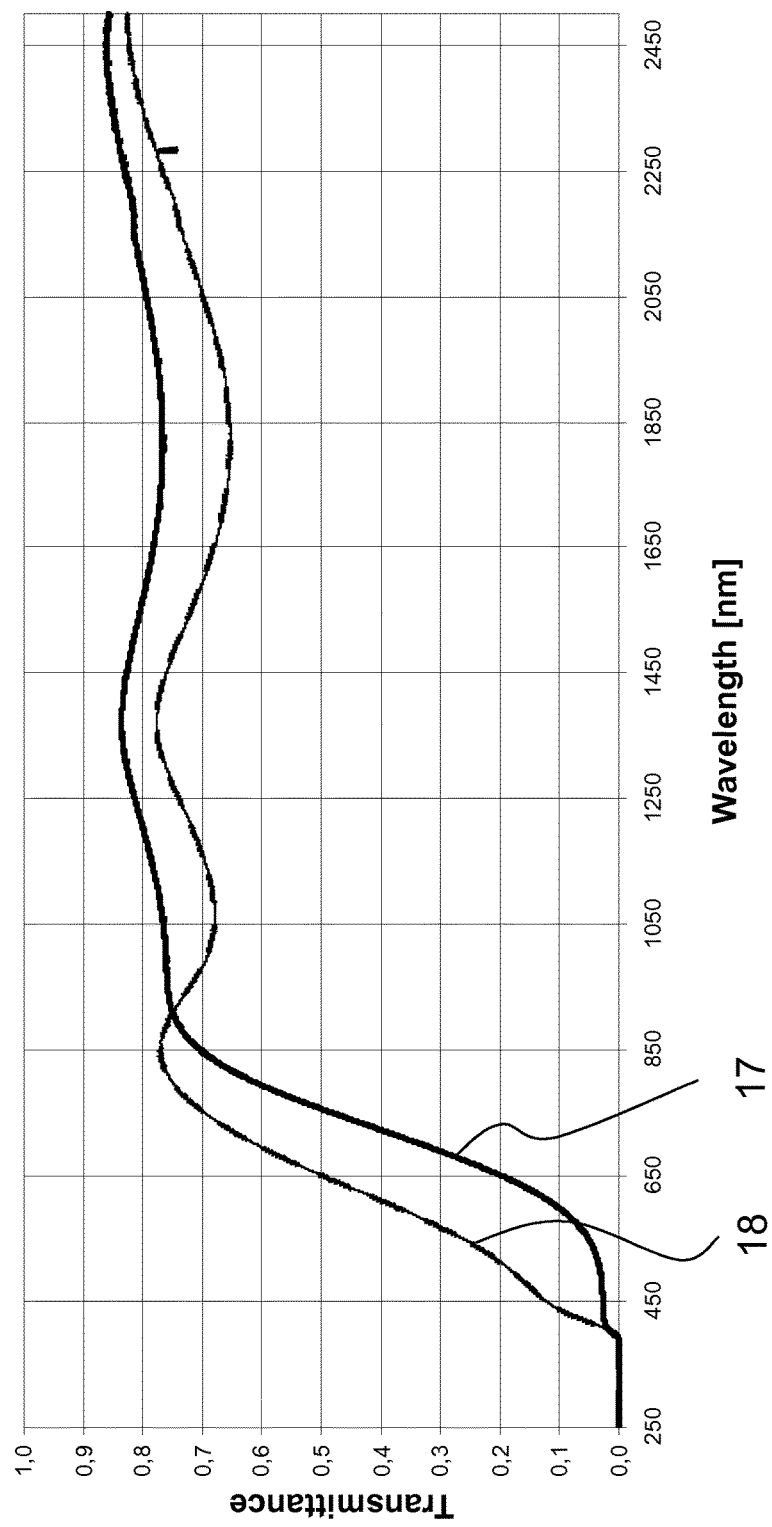
FIG. 3 shows the spectral transmittance of two glass ceramics as a function of wavelength.

For comparison, FIG. 3 shows spectral transmittance characteristics 17, 18 of two glass ceramics. The glass ceramic plates used for the measurement had a thickness of 3 mm and were irradiated perpendicularly to the surface.

The transmittance characteristic designated by reference numeral 17 was measured on a glass ceramic having a low iron oxide content. By contrast, transmittance characteristic 18 was measured on a glass ceramic according to the invention which has an $Fe_2O_3$ content of more than 0.1 percent by weight which, moreover, is higher than the vanadium content. Here, the vanadium content is the same in both samples.

Specifically, the two glass ceramics of transmittance characteristics 17, 18 have the same composition, in percent by weight, of:

| | |
|---|---|
| $SiO_2$ | 65.14 |
| $Al_2O_3$ | 20.9 |
| $Li_2O$ | 3.71 |
| $Na_2O$ | 0.59 |
| $K_2O$ | 0.22 |
| MgO | 0.37 |
| ZnO | 1.5 |
| CaO | 0.42 |
| BaO | 2.3 |
| $TiO_2$ | 3.1 |
| $ZrO_2$ | 1.34 |

-continued

| | |
|---|---|
| $SnO_2$ | 0.24 |
| $V_2O_5$ | 0.026 |
| $MnO_2$ | 0.025. |

The two glass ceramics only differ in the content of iron oxide as a decoloring agent. The glass ceramic with transmittance characteristic 17 has an $Fe_2O_3$ content of 0.093 percent by weight. By contrast, the glass ceramic plate according to the invention with transmittance characteristic 18 has an $Fe_2O_3$ content of 0.2 percent by weight. Thus, first, the content is greater than 0.1 percent by weight, as contemplated by the invention, and, second, it is greater than the content of vanadium oxide $V_2O_5$ by a factor of 7.7. And, the content of titanium oxide is lower than the preferred upper limit of 3.9 percent by weight or less. Furthermore, the condition mentioned before is met: $(M(SnO_2)+0.1*M(TiO_2))/(M(Fe_2O_3)+M(CeO_2))<3$. In this glass ceramic, the ratio of the weight fractions of these components has a value of 2.75.

Preferably, the transparently dyed glass ceramics of the invention have a composition substantially comprising the following components, in wt %, on an oxide basis:

| | |
|---|---|
| $Li_2O$ | 3.0-5.0 |
| $\Sigma\ Na_2O + K_2O$ | 0.2-1.5 |
| MgO | 0-2 |
| $\Sigma\ CaO + SrO + BaO$ | 0-4 |
| ZnO | 0-3 |
| $B_2O_3$ | 0-2 |
| $Al_2O_3$ | 18-25 |
| $SiO_2$ | 55-75 |
| $TiO_2$ | 1-5 |
| $ZrO_2$ | 0-2 |
| $P_2O_5$ | 0-3 |
| $SnO_2$ | 0.15-0.5 |
| $\Sigma\ TiO_2 + ZrO_2 + SnO_2$ | 3.8-6 |
| $V_2O_5$ | 0.005-0.05 |
| $Fe_2O_3 + CeO_2$ | 0.1-0.6. |

As can be seen from the graph of FIG. 3, the iron oxide reduces the absorptivity in the visible spectral range caused by the vanadium oxide which is employed as a coloring agent, in particular between 750 and 450 nanometers, so that even with a high vanadium oxide content of more than 0.02 percent by weight, even with more than 0.025 percent by weight, a transmittance of more than 2.5%, in particular more than 5% is achieved in the visible spectral range between 450 and 750 nanometers. Specifically, the light transmittance Y as measured on a sample of 3 mm thickness with standard illuminant C in the visible spectral range was 28.5%. Furthermore, with standard illuminant A, a light transmittance of Y=31.5% was measured in the visible spectral range. Measurements of the light transmittance with standard illuminant D65 revealed a value of Y=28.4%.

FIG. 3 illustrates another specific effect in conjunction with the decoloration of vanadium oxide due to a high content of $Fe_2O_3$.

Obviously, the effect of decoloration on absorptivity is stronger in the short wavelengths visible spectral range than in the longer wavelengths visible spectral range. A result thereof is that the transmittance characteristic becomes considerably more linear than that of the comparison sample with a lower content of $Fe_2O_3$.

When fitting a straight line in the range of wavelengths from 450 to 700 nanometers using the method of least squares, the coefficient of determination $R^2$ of transmittance characteristic 18 of the glass ceramic according to the invention has a value of 0.9857. By contrast, transmittance characteristic 17 of the comparison sample has a significantly lower value of 0.861. The coefficient of determination $R^2$ is given by:

$$R^2 = 1 - \frac{\sum_{i=1}^{n}(Y_i - \hat{Y}_i)^2}{\sum_{i=1}^{n}(Y_i - \overline{Y})^2}. \quad (1)$$

In this relationship, the $Y_i$ values denote the measured values of transmittance at different wavelengths, $\hat{Y}_i$ the corresponding values of the straight line fitted to the measured values at the respective wavelength corresponding to $Y_i$, and $\overline{Y}$ the average of the $Y_i$ values. The index i numbers the individual measured values of transmittance $Y_i$ up to the largest value n.

The coefficient of determination takes a value between zero (no linear correlation) and one (perfect linear correlation of the measured values), depending on the linear correlation of the measured values. Therefore, the coefficient of determination of 0.9857 demonstrates that the transmittance characteristic is highly linear.

This effect in particular also occurs in the yellow to blue spectral ranges. For an interval of wavelengths from 450 to 600 nanometers, a similarly high coefficient of determination $R^2$ of 0.9829 is obtained for the glass ceramic according to the invention, while the coefficient of determination for the comparison sample is only 0.8589. Generally, as has been shown by way of this example, iron oxide may be metered to the mixture, or the contents of $Fe_2O_3$ and $V_2O_5$ may be adjusted to such a ratio, that with a given vanadium oxide content the spectral transmittance characteristic in a range of wavelengths between 450 and 600 nanometers becomes linear to such an extent that for a straight line fitted to the transmittance characteristic of the glass ceramic using the method of least squares a resulting coefficient of determination $R^2$ is greater than 0.9, preferably greater than 0.95.

This feature is particularly advantageous when using colored displays. If one or more self-luminous display elements emit light of different wavelengths, the approximately linear transmittance characteristic allows for an easier adjustment of the display elements for a true color reproduction.

Figure 4:
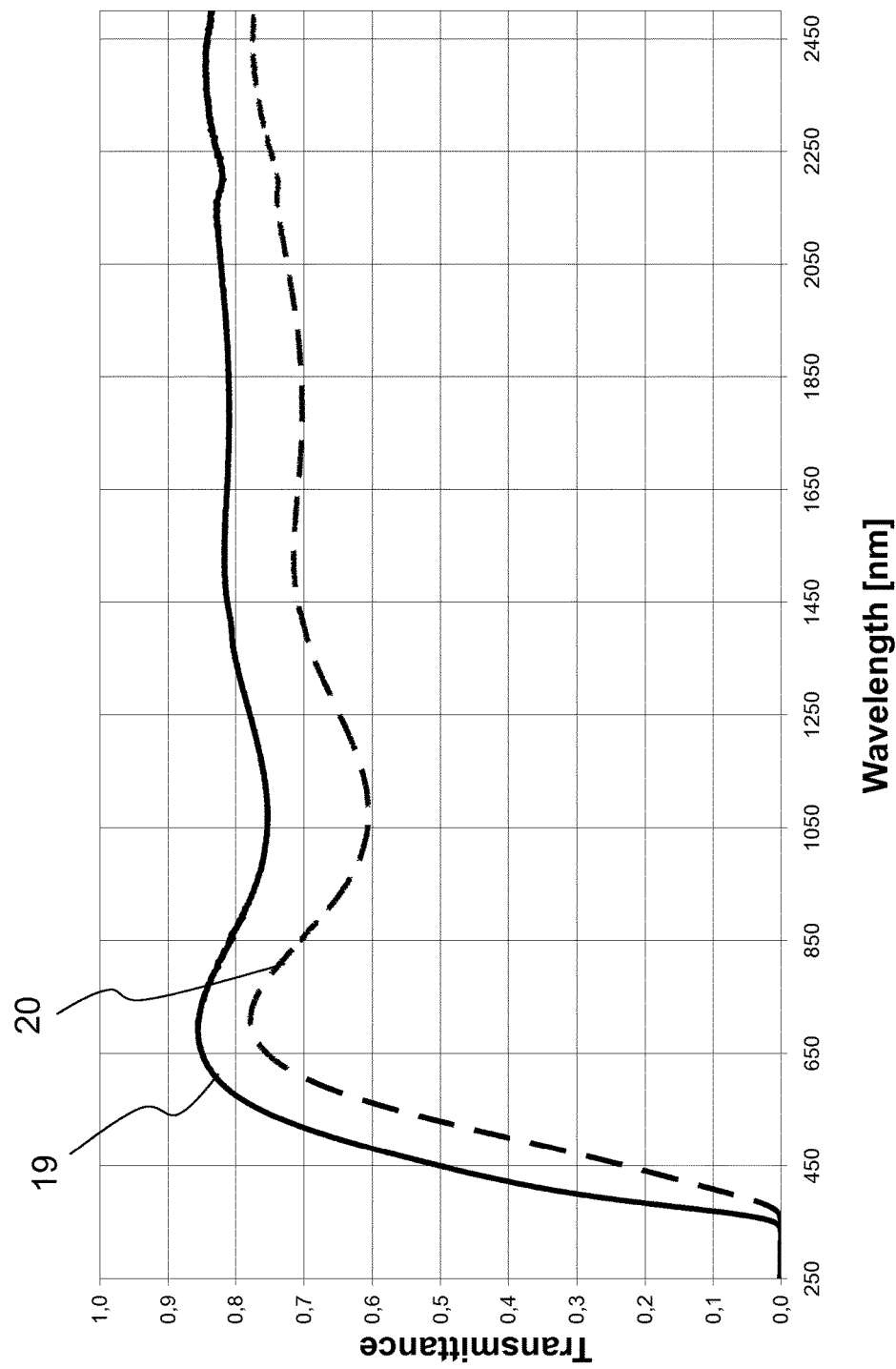
FIG. 4 shows the spectral transmittance of the starting glasses of the two glass ceramics.

Both the coloring caused by the vanadium oxide and the decoloration caused by the iron oxide substantially occur only during ceramization of the starting glass. For comparison to FIG. 3, FIG. 4 shows two transmittance characteristics of the starting glasses of the two samples. In contrast to the data of FIG. 3, the measurements of FIG. 4 were carried out on samples of 4 mm thickness. Transmittance characteristic 19 was measured on the starting glass of the comparison sample, transmittance characteristic 20 on the starting glass of the glass ceramic according to the invention. Due to the higher content of $Fe_2O_3$ in the glass ceramic according to the invention, spectral transmittance is consistently lower here. Although the transmittance in the infrared range is also lower in the ceramized sample due to the iron oxide, as can be seen from FIG. 3, transmittance in the visible range is higher.

Transmittance in the visible spectral range, or the Y value, further depends on the thickness of the glass ceramic plate. In the example of FIG. 3, the thickness was 3 mm, as mentioned above. When a thicker plate is used, for example one of 4 mm thickness, transmittance decreases for the same composition of the starting glass. Therefore, the vanadium oxide content may advantageously be adjusted as a function of the thickness of the plate. Specifically, according to a further embodiment of the invention it is contemplated that the vanadium oxide content is at least 0.066/x percent by weight, wherein x is the thickness of the glass ceramic in millimeters.

Similarly it is possible to adjust the iron oxide content and/or the cerium oxide content as a function of the thickness of the plate in order to obtain specific transmittance values regardless of the thickness of the plate. According to yet another embodiment of the invention it is therefore intended that the iron oxide content or cerium oxide content is at least 0.4/x percent by weight, wherein x is the thickness of the glass ceramic in millimeters.

Figure 5:
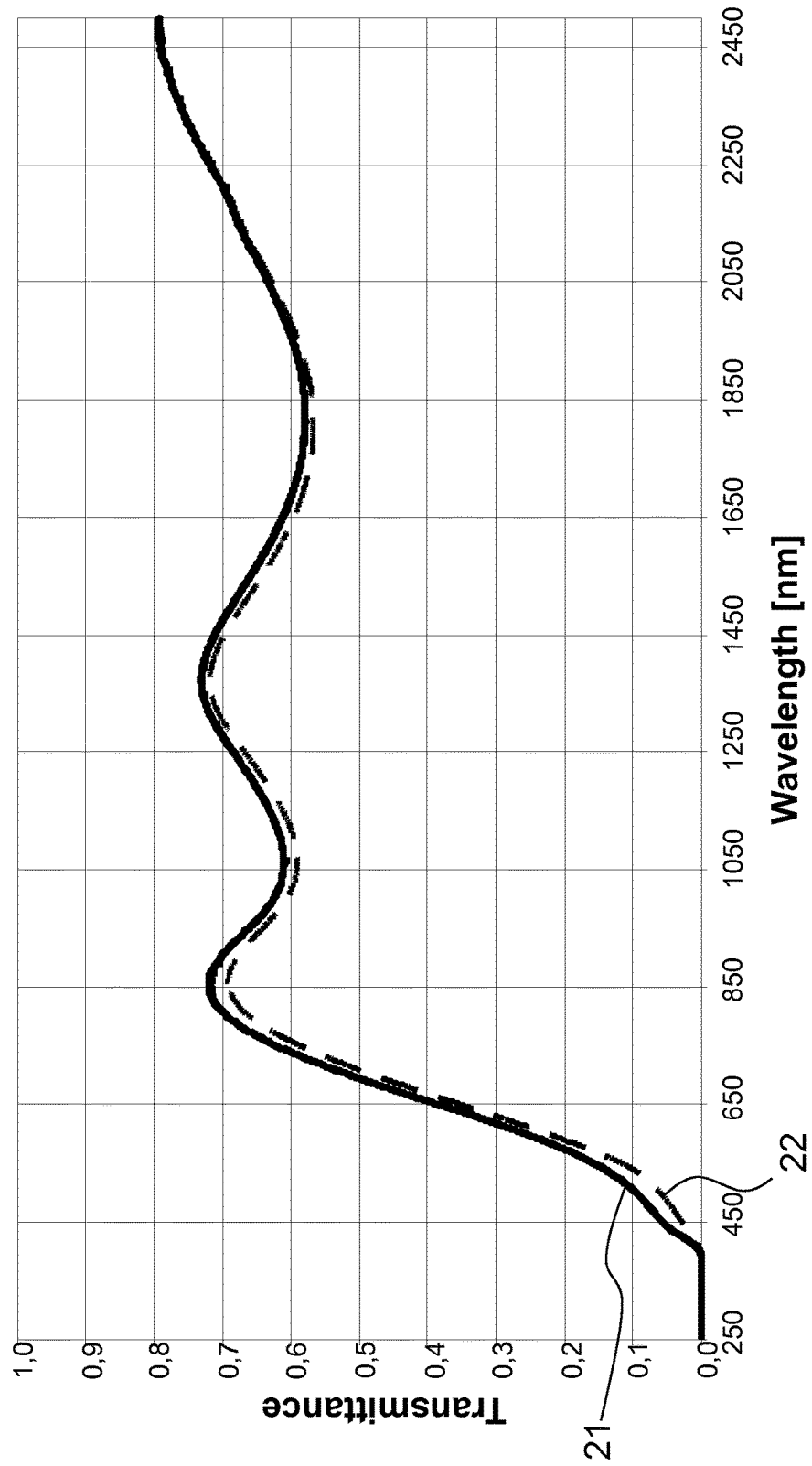
FIG. 5 shows the spectral transmittance of a glass ceramic according to the invention before and after a heat stress test.

The glass ceramic plates of the invention prove to be equally resistant under the extreme operating conditions of a glass ceramic cooktop when compared to conventional glass ceramics, both in terms of coloration and absorption. To illustrate this, FIG. 5 shows two transmittance characteristics 21, 22, both of which were measured on the glass ceramic of the invention on which the examples of FIGS. 3 and 4 were based. Accordingly, the glass ceramic has a $Fe_2O_3$ content of 0.2 percent by weight. From this glass ceramic, a sample of approximately 4 mm thickness was prepared, and transmittance characteristic 21 was measured on this sample.

Then, a subsequent heat treatment was performed at 800° C. for a period of 10 hours, and then transmittance characteristic 22 was measured. According to that, transmittance in the visible spectral range after heat treatment is still 78% of the initial value with light transmission Y. Although transmittance decreases, the percentage reduction of transmittance is within the range of what is found for other volume-colored LAS glass ceramics. In absolute terms, transmittance in the visible spectral range in particular remains significantly higher than that of the comparison sample having a lower $Fe_2O_3$ content of less than 0.1 percent by weight.

The effect of iron oxide and tin oxide on the transmittance of the glass ceramic is moreover well demonstrated by the exemplary embodiments listed in the table below:

| | Sample | | | | | | | |
| --- | --- | --- | --- | --- | --- | --- | --- | --- |
| Component | 1 [ppm] | 2 [ppm] | 3 [ppm] | 4 [ppm] | 5 [ppm] | 6 [ppm] | 7 [ppm] | 8 [ppm] |
| CoO | 0 | 0 | 0 | 0 | 0 | 0 | 0 | 0 |
| NiO | 0 | 0 | 0 | 0 | 0 | 0 | 0 | 0 |
| $Cr_2O_3$ | 0 | 0 | 0 | 0 | 0 | 0 | 0 | 0 |
| $Nd_2O_3$ | 0 | 0 | 0 | 0 | 0 | 0 | 0 | 0 |
| $Er_2O_3$ | 0 | 0 | 0 | 0 | 0 | 0 | 0 | 0 |

-continued

| | Sample | | | | | | | |
|---|---|---|---|---|---|---|---|---|
| Component | 1 [ppm] | 2 [ppm] | 3 [ppm] | 4 [ppm] | 5 [ppm] | 6 [ppm] | 7 [ppm] | 8 [ppm] |
| $MnO_2$ | 1 | 1 | 1 | 1 | 1 | 1 | 1 | 1 |
| $Fe_2O_3$ | 100 | 500 | 750 | 1250 | 1500 | 2000 | 2500 | 3000 |
| $TiO_2$ | 31000 | 31000 | 31000 | 31000 | 31000 | 31000 | 31000 | 31000 |
| $SnO_2$ | 2500 | 2500 | 2500 | 2500 | 2500 | 2500 | 2500 | 2500 |
| $V_2O_5$ | 220 | 220 | 220 | 220 | 220 | 220 | 220 | 220 |
| $ZrO_2$ | 13248 | 13248 | 13248 | 13248 | 13248 | 13248 | 13248 | 13248 |
| (Sn + 0.1Ti)/Fe | 56.00 | 11.20 | 7.47 | 4.48 | 3.73 | 2.80 | 2.24 | 1.87 |
| Fe/V (5-30) | 0.45 | 2.27 | 3.41 | 5.68 | 6.82 | 9.09 | 11.36 | 13.64 |
| Y (4 mm) | 1.89 | 2.1 | 2.25 | 2.58 | 2.77 | 3.17 | 3.64 | 4.17 |

The samples have a thickness of 4 mm. The basic composition of samples 1 to 8 substantially corresponds to the composition specified in the description of FIG. 3, with 65.14 percent by weight of $SiO_2$ and 20.9 percent by weight of $Al_2O_3$. The vanadium oxide content of 220 ppm (0.02 wt %) is somewhat lower than in the examples of FIG. 3 (260 ppm), the $SnO_2$ content of 2500 ppm instead of 2400 ppm is slightly higher. As can be seen from the table, with the sample number increasing the iron oxide content was gradually increased from 100 ppm to 3000 ppm.

In samples 1 to 3, the iron oxide content is still less than 1000 ppm, in sample 4 a $Fe_2O_3$ content of more than 1000 ppm is reached, with 1250 ppm. While in the comparison examples of samples 1 to 3 the transmittance (indicated as Y color value) is still less than 2.5%, this value is exceeded in sample 4. The transmittance clearly increases further as the $Fe_2O_3$ content increases, as can be seen from the transmittance values of samples 4 to 8, and with an $Fe_2O_3$ content of 3000 ppm and the given plate thickness of 4 millimeters, a transmittance of 4.17% is obtained in the visible spectral range.

The preferred additional condition $(M(SnO_2)+0.1*M(TiO_2))/(M(Fe_2O_3)+M(CeO_2))<4$, that the ratio of the components in percent by weight (designated (Sn+0.1Ti)/Fe in the table) is less than 4, is achieved in all samples 5 to 8 of the invention. In samples 5 to 8, this ratio is less than three.

And, in all samples 4 to 8 of the invention, the ratio of weight fractions $Fe_2O_3/V_2O_5$ (abbreviated Fe/V in the table) is between 5 and 20 as preferably contemplated according to the invention, while in samples 1 to 3 this ratio has a value of less than 5.

From these examples it is apparent that for a glass ceramic article of a given vanadium oxide containing composition a predetermined transmittance can be adjusted in a simple manner by adding a metered amount of iron oxide. The transmittance value of course also depends on the thickness of the glass ceramic article. If the thickness of the glass ceramic article is less than the 4 mm thickness of the example, a smaller amount of iron oxide will be sufficient for a specific transmittance value. Therefore, in order to produce a glass ceramic article such as a glass ceramic cooktop with a predefined transmittance, first a transmittance value of 2.5% or more in the visible spectral range is predetermined, wherein this transmittance value is higher than the transmittance value of a glass ceramic made from the same vanadium oxide containing mixture but with an iron oxide content of less than 0.1 percent by weight. Then, iron oxide is added to the melt or mixture to be melted in an amount which neutralizes the absorption caused by the vanadium oxide in the visible spectral range to such an extent that the predetermined transmittance value is obtained in the glass ceramic with the intended thickness of the glass ceramic article. The method may likewise be performed using $CeO_2$ instead of or in addition to $Fe_2O_2$.

$CeO_2$, likewise, is very effective as a decoloring agent for $V_2O_5$ containing glass ceramics, as will be shown by the following exemplary embodiment. Two lithium aluminosilicate glass ceramic samples of similar composition were prepared, the comparison sample with a $V_2O_5$ content of 0.2 percent by weight, and the sample according to the invention with a $V_2O_5$ content of 0.4 percent by weight, i.e. twice as high. If, additionally, 0.5 percent by weight of $CeO_2$ is added to the latter mixture, transmittance remains almost the same, although, as mentioned before, $V_2O_5$ is a very strong color-imparting agent strongly absorbing in the visible spectral range. In other words, the addition of $CeO_2$ compensates for a doubling of the $V_2O_5$ content in terms of transmittance in the visible spectral range.

The mixtures of the sample according to the invention and of the comparison sample have the following compositions:

| Component: | Comparison Sample: | Sample of the invention: |
|---|---|---|
| $Al_2O_3$ | 22.47 | 22.21 |
| $K_2O$ | 0.20 | 0.20 |
| $Li_2O$ | 4.08 | 4.00 |
| MgO | 1.00 | 0.98 |
| $Na_2O$ | 0.64 | 0.64 |
| $P_2O_5$ | 1.33 | 1.32 |
| $SiO_2$ | 65.84 | 65.35 |
| $SnO_2$ | 0.44 | 0.40 |
| $TiO_2$ | 1.80 | 1.80 |
| $V_2O_5$ | 0.20 | 0.41 |
| ZnO | 0.20 | 0.20 |
| $ZrO_2$ | 2.00 | 2.00 |
| ZnO | 0.00 | 0.20 |
| $CeO_2$ | 0.00 | 0.50 |

Light transmittance of the ceramized samples in the visible spectral range is 1.2% in a comparison sample of 4 mm thickness, and is still 1.1% in the sample decolored with $CeO_2$. At a wavelength of 600 nanometers, the comparison sample has a transmittance of 2.49%. The transmittance of the sample decolored using $CeO_2$ is virtually the same, with 2.44%.

In a preferred embodiment, the $CeO_2$ content should be at most 0.6 wt %. Higher contents are inefficient in view of the decreasing effect.

For the embodiment of the glass ceramic which is transparent in volume, iron oxide is contained in the mixture as a coloring agent. Unlike in transparently dyed glass ceramics, an addition of further coloring agents such as vanadium, nickel, cobalt compounds is preferably omitted, because a highest possible light transmittance is desired. An addition of neodymium oxide as a physical agent for decoloration is optionally possibly. If the latter is added, the coloration of the glass ceramic is reduced by the additional absorption bands. In contrast to the method of the invention, however, this is at the expense of light transmittance which is why the content of neodymium is limited.

On the one hand, the iron oxide included in the mixture has a color-imparting effect in the short-wavelength part of the spectrum as $Fe^{3+}$, and especially upon ceramization due to a formation of Fe/Ti coloring complexes. The $Fe^{2+}$ absorbs in the near infrared. Iron oxide is polyvalent and its coloring effect may vary considerably due to a transformation between oxidation states. In addition, the coloring effect in conjunction with the favorable nucleating agent $TiO_2$ is strong. This is even more critical because in the embodiment of a transparent glass ceramic light transmittance values of greater than 80, preferably greater than 83% (with 4 mm thickness) are desired. In economic manufacturing, the iron oxide is typically included in the raw material mixture in amounts of about 0.005 to 0.05 wt %. The titanium oxide is preferably included as a nucleating agent with a content of at least 1 wt %, because it is favorable for the melting properties and for ceramization.

Preferably, a transparent glass ceramic according to the invention or the mixture provided for producing the glass ceramic substantially includes the following components, in percent by weight, on an oxide basis:

| | |
|---|---|
| Li2O | 3-5 |
| Al2O3 | 18-25 |
| SiO2 | 55-75 |
| TiO2 | 1-2.5 |
| Fe2O3 | 0.005-0.05. |

Furthermore, preferably, the transparent glass ceramics of the invention have a composition essentially comprising the following components, in wt %, on an oxide basis:

| | |
|---|---|
| Li2O | 3-5 |
| ΣNa2O + K2O | 0.2-2.0 |
| MgO | 0-2 |
| ΣCaO + SrO + BaO | 0-4 |
| ZnO | 0-3 |
| B2O3 | 0-2 |
| Al2O3 | 18-25 |
| SiO2 | 55-75 |
| TiO2 | 1-2.5 |
| ZrO2 | 1-2 |
| SnO2 | 0-0.4 |
| ΣSnO2 + TiO2 | <2.7 |
| P2O5 | 0-3.0 |
| Fe2O3 | 0.005-0.05 |
| Nd2O3 | 0-0.4 |
| CoO | 0-0.004, | and with the addition of a chemical refining agent such as $SnO_2$, $As_2O_3$, $Sb_2O_3$, and sulfate and/or chloride compounds in total amounts of up to 2.0 wt %.

A decoloring agent that has been found to be very effective, especially for the coloring agent iron oxide, is selenium oxide. Therefore, according to one embodiment of the invention, iron oxide is included in the mixture as a coloring agent, and selenium oxide is added as a decoloring agent before or during the preparation of the starting glass, i.e. in particular before or during the melting including the refining, for adjusting a desired or predefined elevated transmittance. Preferably, up to 0.5 wt % of selenium oxide are added. The effect is surprising because the major part thereof is evaporated during melting.

Figure 6:
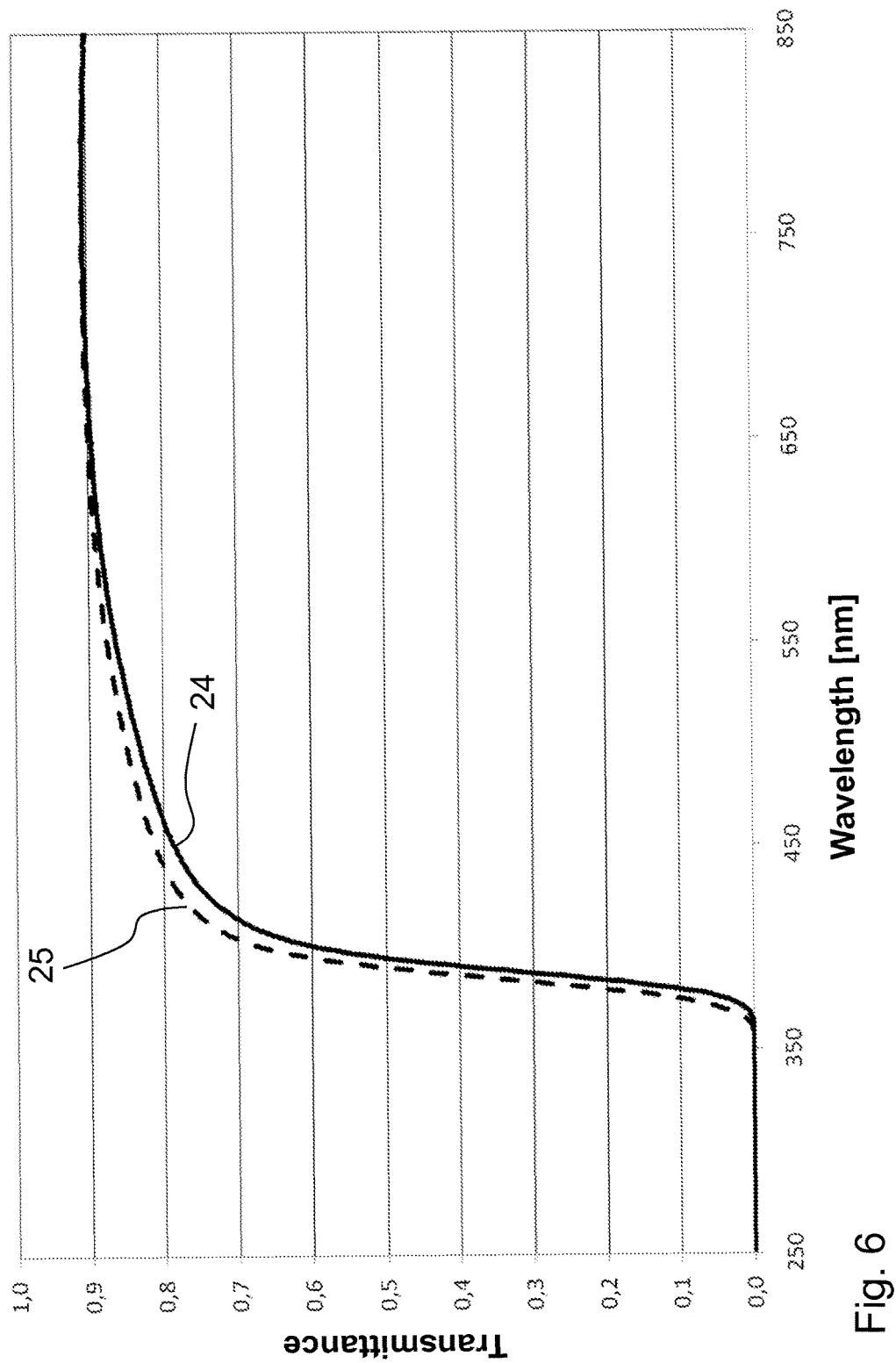
FIG. 6 shows transmittance characteristics of a glass ceramic decolored with selenium and of a comparison sample.

To illustrate the above, FIG. 6 shows transmittance characteristics of a glass ceramic decolored using selenium oxide (curve 25), and of a comparison sample (curve 24) with the same composition except for the added selenium oxide. As can be seen from the two curves 24, 25, the addition of selenium oxide results in a transmission-enhancing decoloration of the iron oxide contained in the provided mixture, in the visible spectral range from 450 to 750 nanometers. The decoloration moreover causes a shift of the absorption edge towards shorter wavelengths.

For a thickness of 4 mm, the following transmittance values are resulting in the visible spectral range. Indicated in each case is the Y value of the CIE color model, and the yellowness value (according to the ASTM 1925/70 (77, 85) standard):

a) Standard illuminant A:
Comparison sample (curve 24): Y=87.0%,
Decolored glass ceramic (curve 25): Y=88.1%.
b) Standard illuminant D65:
Comparison sample (curve 24): Y=86.3%,
Decolored glass ceramic (curve 25): Y=87.5%.
c) Standard illuminant C:
Comparison sample (curve 24): Y=86.3%,
Decolored glass ceramic (curve 25): Y=87.5%.
Under standard illuminant C, this corresponds to an increase in transmittance of about 1.2%.

A further measure of the lightening is the yellowness index which is 8.9 in the glass ceramic of the invention, but 11.2 in the comparison sample.

The composition of the mixture provided and hence also the composition of the comparison sample is as listed below, in wt %, as measured by X-ray fluorescence on the glass ceramic:

| | |
|---|---|
| Al2O3 | 19.44 |
| As2O3 | 0.93 |
| BaO | 0.81 |
| CaO | 0.037 |
| Fe2O3 | 0.024 |
| K2O | 0.205 |
| MgO | 1.10 |
| MnO2 | 0.002 |
| Na2O | 0.15 |
| P2O5 | 0.03 |
| SiO2 | 67.89 |
| SnO2 | 0.00 |
| TiO2 | 2.67 |
| V2O5 | 0.00 |
| ZnO | 1.47 |
| ZrO2 | 1.78. |

For the decolored glass ceramic according to the invention, 1000 ppm of selenium oxide were additionally added to the mixture.

The examples are transparent glass ceramics free of $V_2O_5$, which were refined with $As_2O_3$. When 1000 ppm of SeO is added, only approximately 10 ppm of $SeO_2$ will remain in the glass ceramic. Thus, the composition of the glass ceramic produced according to the invention virtually does not differ from that of the comparison sample, despite of the different transmittance.

According to yet another embodiment of the invention, a transparent lithium aluminosilicate glass ceramic article is produced, which is refined without or at least without substantial proportions (in total less than 0.1 wt %) of arsenic oxide and antimony oxide. Alternatively, refining is preferably accomplished using tin oxide and/or chlorine and sulfate compounds. In the presence of Sn, an Sn/Ti coloring complex will be formed in addition to the Fe/Ti coloring complex. In this glass ceramic it has moreover been found useful to add arsenic oxide in contents of up to 0.2 wt % as a decoloring agent. Not more than 0.1 wt % of $As_2O_3$ should remain in the glass ceramic as a component. Selenium oxide may be added additionally.

According to one embodiment of the invention it is therefore suggested that a mixture is provided including iron oxide as a coloring agent and titanium oxide as a nucleating agent, and that arsenic oxide is added as a decoloring agent in an amount of less than 0.2 wt %. Preferably, refining is accomplished without antimony oxide using tin oxide and/or chlorine or sulfate compounds. The preferred refining which uses from 0.15 to 0.5 wt % of tin oxide may be promoted by chloride and/or sulfate compounds and by refining at a high temperature above 1750° C. Additions of fluorine or bromine compounds for refining purposes are unfavorable because of the corrosive effect of the vapors on the melting unit. The contents thereof in the glass ceramic, which result from impurities in the mixture, are usually below 0.04 wt %.

Figure 7:
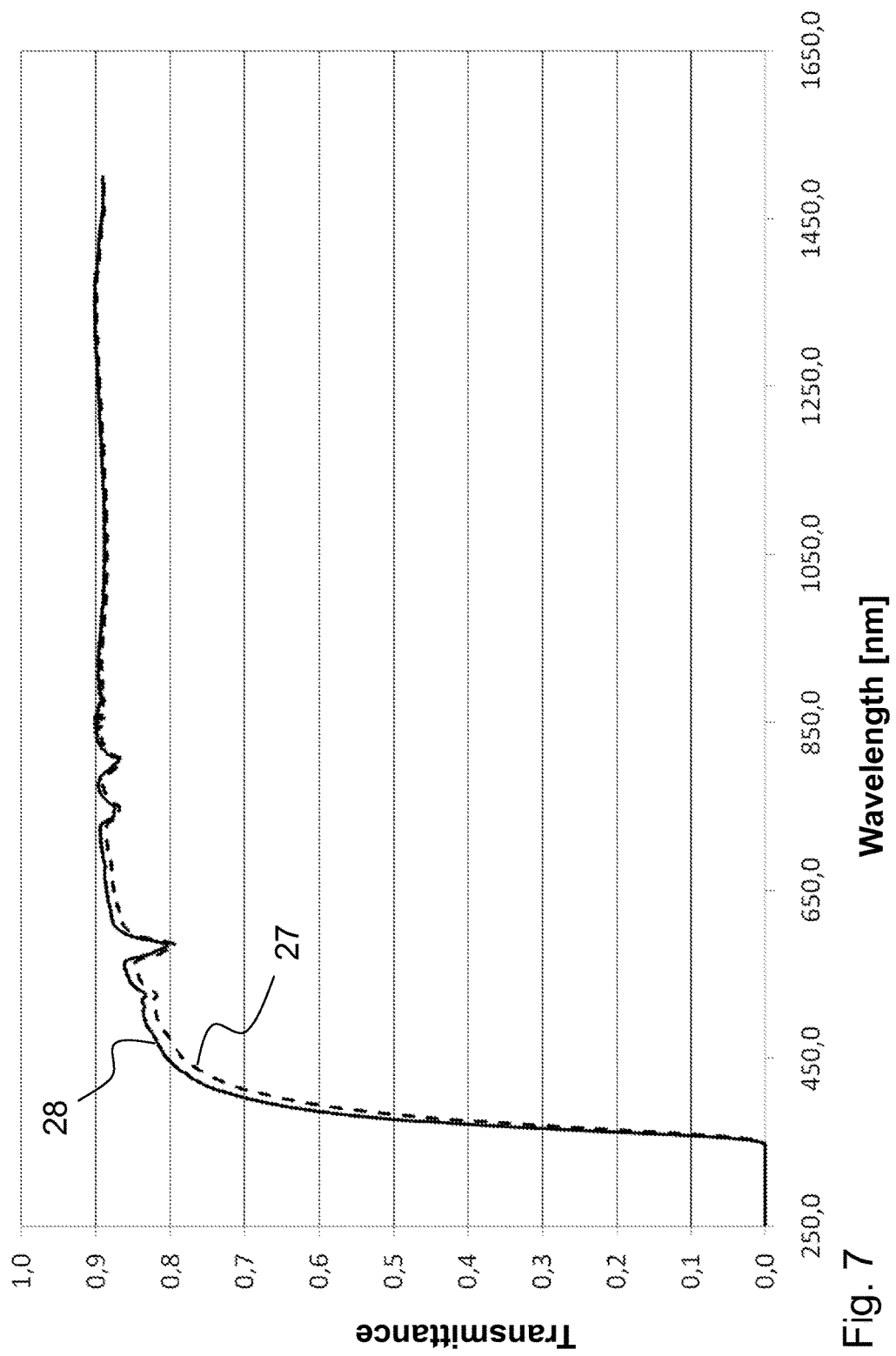
FIG. 7 shows transmittance characteristics of a glass ceramic decolored with arsenic oxide and of a comparison sample.

To illustrate the above, FIG. 7 shows transmittance characteristics of samples of 4 mm thickness, of a glass ceramic decolored with arsenic oxide (curve 28), and of a comparison sample (curve 27). The composition of the two glass ceramics is the same, except for the addition of arsenic oxide in the glass ceramic according to the invention.

The composition of the mixture provided and accordingly also the composition of the comparison sample is as listed below:

| Component | wt % |
|---|---|
| Li2O | 3.66 |
| Na2O | 0.55 |
| K2O | 0.10 |
| MgO | 0.63 |
| CaO | 0.24 |
| BaO | 0.55 |
| ZnO | 1.90 |
| Al2O3 | 21.63 |
| SiO2 | 66.03 |
| SnO2 | 0.20 |
| SrO | 0.51 |
| TiO2 | 2.17 |
| ZrO2 | 1.75 |
| Fe2O3 | 0.011 |
| Nd2O3 | 0.061 |
| As2O3 | 0.0 |

For the glass ceramic of the invention, 0.055 wt % of $As_2O_3$ were added of which 0.046 wt % remain in the glass ceramic.

The effect of an increase in transmittance due to a decoloration of the coloring agent $Fe_2O_3$ in the visible spectral range can be clearly seen from the higher transmittance of curve 28 with respect to transmittance characteristic 27 of the comparison sample, which corresponds to an increase in light transmittance Y from 83.4 to 84.7% (standard illuminant C, 4 mm thickness).

Moreover, it has found to be favorable for the decoloring mechanism in transparent glass ceramics on which the invention is based, to avoid excessive levels of tin oxide and titanium oxide, as these may form coloring complexes with the iron oxide. Accordingly, in a modification of the invention the transparent glass ceramic comprises a content of tin oxide of less than 0.5 percent by weight, preferably a content of tin oxide in a range from 0.15 to 0.4 percent by weight, more preferably in a range from 0.15 to 0.25 percent by weight. These amounts of tin oxide will usually be sufficient for refining the starting glass for the glass ceramic, even without appreciable amounts of arsenic oxide, $As_2O_3$, or antimony oxide, $Sb_2O_3$. Optionally, the refining using chlorine and/or sulphate compounds may be carried out in combination with tin oxide. Refining may be improved by high-temperature refining at more than 1700° C., preferably more than 1750° C. Here again, the total amount of $As_2O_3$ and $Sb_2O_3$ together is preferably less than 0.1 percent by weight, most preferably the glass ceramic is technologically free of these refining agents. That is, they will not be detectable by conventional methods for determining weight proportions.

As to the titanium oxide content it is advantageous in this case if it is not more than 2.5 percent by weight. A content from 1 to 2.5 percent by weight is preferred. With this content it is ensured at the same time that a sufficient nucleation for ceramization occurs, because titanium oxide functions as a nucleating agent. A transparent glass ceramic in the meaning of the embodiments described above refers to a glass ceramic which at a thickness from 2 to 7 millimeters exhibits a transmittance of at least 60% in the visible spectral range.

What is claimed is:
1. A method for producing a lithium aluminosilicate glass ceramic article, comprising the steps of:
providing a mixture for lithium aluminosilicate glass ceramics, the mixture including a coloring agent comprising vanadium oxide, the coloring agent absorbing light in the lithium aluminosilicate glass ceramic in the visible spectral range between 450 and 750 nanometers;
melting the mixture and producing a glass precursor;
ceramizing the glass precursor to obtain the glass ceramic article;
determining a proportion of a decoloring agent to be added to the mixture based on a desired transmittance of the glass ceramic article in the visible spectral range between 450 and 750 nanometers, the desired transmittance being greater than 2.5%; and
adding, before or during melting, the proportion of the decoloring agent to the mixture, the decoloring agent comprising iron oxide, the decoloring agent reducing absorptivity of the coloring agent in at least a sub-region of the visible spectral range upon ceramization so as to compensate for a reduction in the transmittance of the glass ceramic article in the visible spectral range between 450 and 750 nanometers due to absorption of light by the coloring agent,
wherein the mixture has a ratio of a total content of tin oxide and titanium oxide to a total content of the iron oxide and/or cerium oxide that comprises $(M(SnO_2) + 0.1*M(TiO_2))/(M(Fe_2O_3)+M(CeO_2))<4$, wherein M denotes an amount of the oxide, in percent by weight, and wherein the total content of the iron oxide is from greater than 0.3 to 0.6 weight percent on an oxide basis.
2. The method as claimed in claim 1, wherein the decoloring agent is added before melting.
3. The method as claimed in claim 1, wherein the decoloring agent is added during melting.
4. The method as claimed in claim 1, further comprising successively producing a plurality of glass ceramic articles with a different transmittance by varying the proportion of the decoloring agent.

5. The method as claimed in claim 1, wherein the decoloring agent has a coloring effect in the visible spectral range due to absorption.

6. The method as claimed in claim 1, wherein the iron oxide and/or cerium oxide have a sum by weight that is greater than a weight of the vanadium oxide by a factor of from 5 to 20.

7. The method as claimed in claim 1, wherein the step of melting the mixture and producing the glass precursor comprises a continuous melting process.

8. The method as claimed in claim 1, wherein the mixture comprises components, in weight percent, on an oxide basis of:

| | |
|---|---|
| $Li_2O$ | 3-5, |
| $Al_2O_3$ | 18-25, |
| $SiO_2$ | 55-75, and |
| $TiO_2$ | 1-5. |

9. The method as claimed in claim 8, wherein the mixture further comprises, for a transparent glass ceramic, $TiO_2$ in a range from 1 to 2.5 percent by weight.

10. The method as claimed in claim 1, wherein the coloring agent comprises vanadium oxide and the decoloring agent comprises iron oxide, wherein the iron oxide is metered to the mixture in an amount so that for a given vanadium oxide content the spectral transmittance characteristic of the glass ceramic in a range of wavelengths between 450 and 600 nanometers becomes linear to such an extent that for a straight line fitted to the transmittance characteristic of the glass ceramic using the method of least squares, a resulting coefficient of determination $R^2$ in a range of wavelengths between 450 and 600 nanometers is greater than 0.9.

11. The method as claimed in claim 1, wherein the mixture comprises titanium oxide as a nucleating agent.

12. The method as claimed in claim 11, wherein the decoloring agent comprises selenium oxide.

13. The method as claimed in claim 11, wherein the decoloring agent comprises arsenic oxide with a content of less than 0.2 wt %.

14. The method as claimed in claim 13, further comprising refining without antimony oxide using tin oxide and/or chlorine or sulfate compounds.

15. The method as claimed in claim 1, wherein the mixture has a proportion by weight of chromium or chromium oxide of less than 0.01%.

16. The method as claimed in claim 15, wherein the proportion by weight of chromium or chromium oxide is less than 0.005%.

17. The method as claimed in claim 1, wherein the ratio is <3.

18. The method as claimed in claim 1, wherein the step of adding the proportion of the decoloring agent to the mixture comprises adding the decoloring agent that further comprises cerium oxide, and wherein the total content of the iron oxide and the cerium oxide is at most 0.6 weight percent on an oxide basis.

19. A method for producing a lithium aluminosilicate glass ceramic article, comprising the steps of:
providing a mixture for lithium aluminosilicate glass ceramics, the mixture including a coloring agent comprising vanadium oxide, the coloring agent absorbing light in the lithium aluminosilicate glass ceramic in the visible spectral range between 450 and 750 nanometers;

melting the mixture and producing a glass precursor;

ceramizing the glass precursor to obtain the glass ceramic article;

determining a proportion of a decoloring agent to be added to the mixture based on a desired transmittance of the glass ceramic article in the visible spectral range between 450 and 750 nanometers, wherein the desired transmittance being greater than 5% ; and adding, before or during melting, the proportion of the decoloring agent to the mixture, the decoloring agent comprising iron oxide and/or cerium oxide, the decoloring agent reducing absorptivity of the coloring agent in at least a sub-region of the visible spectral range upon ceramization so as to compensate for a reduction in the transmittance of the glass ceramic article in the visible spectral range between 450 and 750 nanometers due to absorption of light by the coloring agent, wherein the mixture has a ratio of a total content of tin oxide and titanium oxide to a total content of the iron oxide and/or cerium oxide that comprises $(M(SnO_2)+0.1*M(TiO_2))/(M(Fe_2O_3)+M(CeO_2))<4$, and wherein M denotes an amount of the oxide, in percent by weight.

* * * * *